(12) United States Patent
Zhang et al.

(10) Patent No.: US 9,952,402 B2
(45) Date of Patent: Apr. 24, 2018

(54) ADJUSTING MECHANISM AND LASER COLLIMATOR HAVING THE SAME

(71) Applicant: Changzhou Huada Kejie Opto-Electroc Instrument Co., Ltd, Jiangsu (CN)

(72) Inventors: Ou Zhang, Jiangsu (CN); Dongdong Peng, Jiangsu (CN)

(73) Assignee: Changzhou Huada Kejie Opto-Electro Instrument Co., Ltd., Jiangsu (CN)

( * ) Notice: Subject to any disclaimer, the term of this patent is extended or adjusted under 35 U.S.C. 154(b) by 363 days.

(21) Appl. No.: 14/885,570

(22) Filed: Oct. 16, 2015

(65) Prior Publication Data
US 2016/0103295 A1    Apr. 14, 2016

Related U.S. Application Data

(63) Continuation of application No. PCT/CN2013/000628, filed on May 28, 2013.

(30) Foreign Application Priority Data

Apr. 18, 2013    (CN) .......................... 2013 1 0136036

(51) Int. Cl.
| | | |
|---|---|---|
| *G02B 27/30* | (2006.01) | |
| *G02B 7/00* | (2006.01) | |
| *F16H 48/38* | (2012.01) | |
| *G01C 15/00* | (2006.01) | |
| *F16H 25/20* | (2006.01) | |

(52) U.S. Cl.
CPC ............. *G02B 7/005* (2013.01); *F16H 25/20* (2013.01); *F16H 48/38* (2013.01); *G01C 15/004* (2013.01); *G02B 27/30* (2013.01)

(58) Field of Classification Search
CPC ........ F16H 3/0915; F16H 3/42; F16H 57/022; G02B 27/0149; G02B 2027/0154; G02B 2027/0156
USPC .......................................................... 359/641
See application file for complete search history.

(56) References Cited

FOREIGN PATENT DOCUMENTS

| | | |
|---|---|---|
| CN | 201218731 Y | 4/2009 |
| CN | 201866174 U | 6/2011 |
| CN | 202274057 U | 6/2012 |
| CN | 202418473 U | 9/2012 |
| CN | 203249622 U | 10/2013 |
| GB | 2426798 A | 6/2006 |

OTHER PUBLICATIONS

International Search Report, Intl. Application No. PCT/CN2013/000628, dated Jan. 30, 2014, 3 pages.

(Continued)

*Primary Examiner* — Mahidere Sahle
(74) *Attorney, Agent, or Firm* — Barley Snyder

(57) ABSTRACT

An adjusting mechanism is disclosed. The adjusting mechanism has a differential, first and second stepping motors engaging with the differential, a screw rod connected to the output shaft of the differential such that the screw rod rotates along with the rotation of the output shaft, and a moving block threadably connected to the screw rod to permit motion of the moving block along the longitudinal axis of the screw rod. The output shaft of the adjusting mechanism rotates according to the rotation of the first and second stepping motors, so as to drive the movement of the moving block along the screw rod.

20 Claims, 6 Drawing Sheets

(56) References Cited

OTHER PUBLICATIONS

Abstract of CN203249622, dated Oct. 23, 2013, 2 pages.
Abstract of CN202418473, dated Sep. 5, 2012, 2 pages.
Abstract of CN202274057, dated Jun. 13, 2012, 2 pages.
Abstract of CN201218731, dated Apr. 8, 2009, 2 pages.
Abstract of CN201866174, dated Jun. 15, 2011, 2 pages.
Abstract of GB2426798, dated Dec. 6, 2006, 2 pages.

US 9,952,402 B2

ADJUSTING MECHANISM AND LASER COLLIMATOR HAVING THE SAME

CROSS-REFERENCE TO RELATED APPLICATIONS

This application is a continuation of PCT International Application No. PCT/CN2013/000628 filed May 28, 2013, which claims priority under 35 U.S.C. § 119 to Chinese Patent Application 2013-10136036.8 filed Apr. 18, 2013.

FIELD OF THE INVENTION

The invention relates to an adjusting mechanism of a collimator, and more particularly to a motor mechanism adjusting the position of a laser collimator.

BACKGROUND

Laser collimator instruments are used in a wide variety of known applications to transmit and/or collect laser beams. In many applications, the collimator is required to be horizontally level. The collimator is normally arranged on, for example, a suspension means or a swinging bracket, and an adjusting mechanism adjusts the suspension means or swinging bracket so that the laser collimator is horizontal and level.

The adjusting mechanism in the prior art levels the swinging bracket and laser collimator by a single motor. A single motor can effectively adjust the laser collimator either quickly or accurately, but cannot adjust the collimator both quickly and accurately.

SUMMARY

The object of the invention is to create an adjusting mechanism for a laser collimator that can adjust the position of the collimator simultaneously both quickly and accurately. The adjusting mechanism has a differential including a first output shaft, a second output shaft, a first driven gear, and a second driven gear, the second output shaft connected to the first driven gear and the second driven gear, a first stepping motor with a first drive gear disposed on a rotary shaft thereof, the first drive gear engaging with the first driven gear, a second stepping motor with a second drive gear disposed on a rotary shaft thereof, the second drive gear engaging with the second driven gear, a screw rod connected to the first output shaft at a first end of the screw rod such that the screw rod rotates along with the rotation of the first output shaft, and a moving block threadably connected to the screw rod to permit motion of the moving block along the longitudinal axis of the screw rod. The first output shaft of the adjusting mechanism rotates according to the rotation of the first and second stepping motors, so as to drive the movement of the moving block along the screw rod.

BRIEF DESCRIPTION OF THE DRAWINGS

The invention will now be described by way of example with reference to the accompanying figures, of which.

DETAILED DESCRIPTION OF THE EMBODIMENTS

The invention is explained in greater detail below with reference to embodiments of an adjusting mechanism of a laser collimator. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
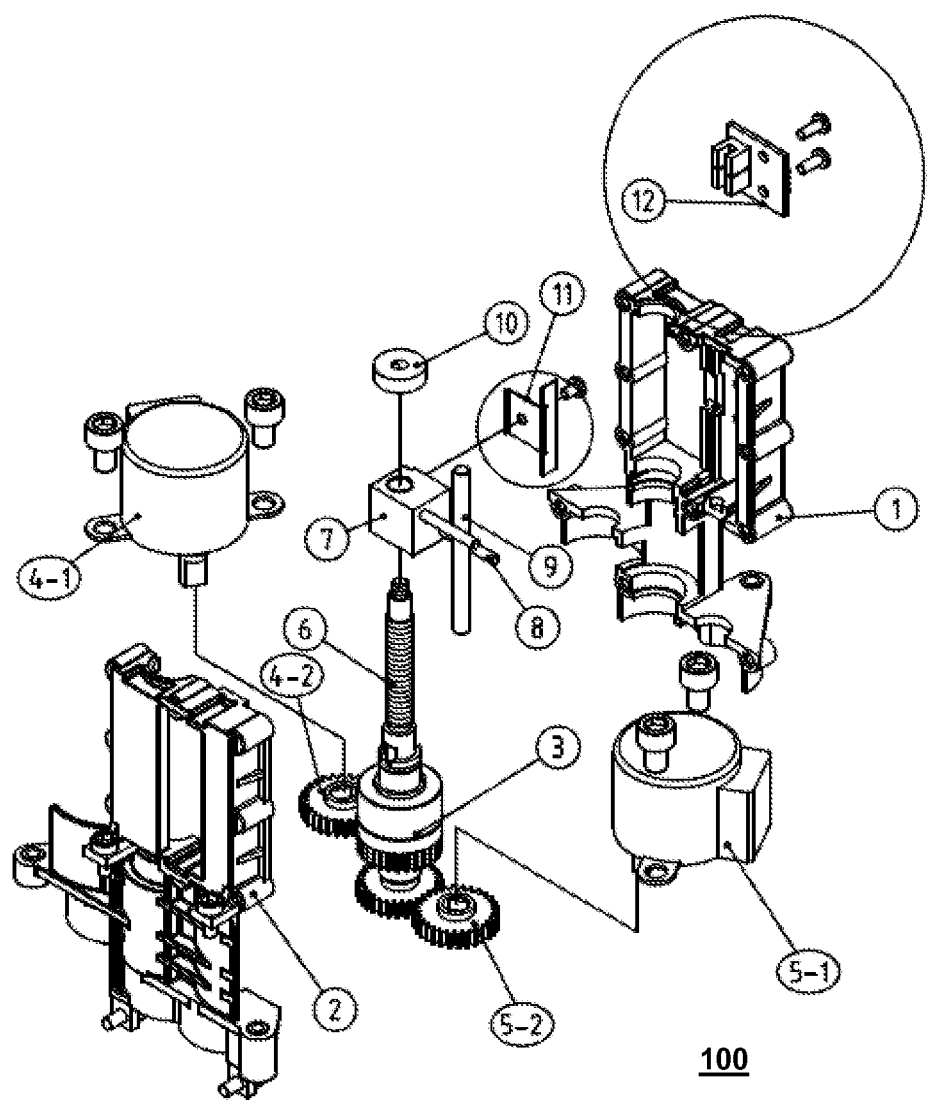
FIG. 1 is an exploded view of the adjusting mechanism according to an embodiment of the invention.

The major components of the adjusting mechanism of the present invention are described with reference to FIG. 1. FIG. 1 shows an adjusting mechanism 100 according to an embodiment in the invention. The adjusting mechanism 100 is provided with a first case body 1 and a second case body 2, which combine to form a housing. The adjusting mechanism 100 also includes a first active gear 4-2 positioned on the rotation shaft of a first stepping motor 4-1. A second active gear 5-2 is positioned on the rotation shaft of a second stepping motor 5-1. The first active gear 4-2 and the second active gear 5-2 engage with gears positioned on a differential 3.

One end of a screw rod 6 is attached to the differential 3 while the other end extends through a moving block 7 and through a screw rod stationary hole arranged on the housing, and is attached to housing via a screw rod stationary ring 10. The moving block is threadably connected to the screw rod 6. The moving block 7 is further connected to two parallel rods 8, which have a gap to accept the limit rod 9. The limit rod 9 is parallel to the screw rod 6. Limit piece 11 is provided on the moving block 7 and a limit PCB 12 is correspondingly provided in the second case body 2. Each of the major components of the adjusting mechanism will now be described in greater detail.

Figure 2:
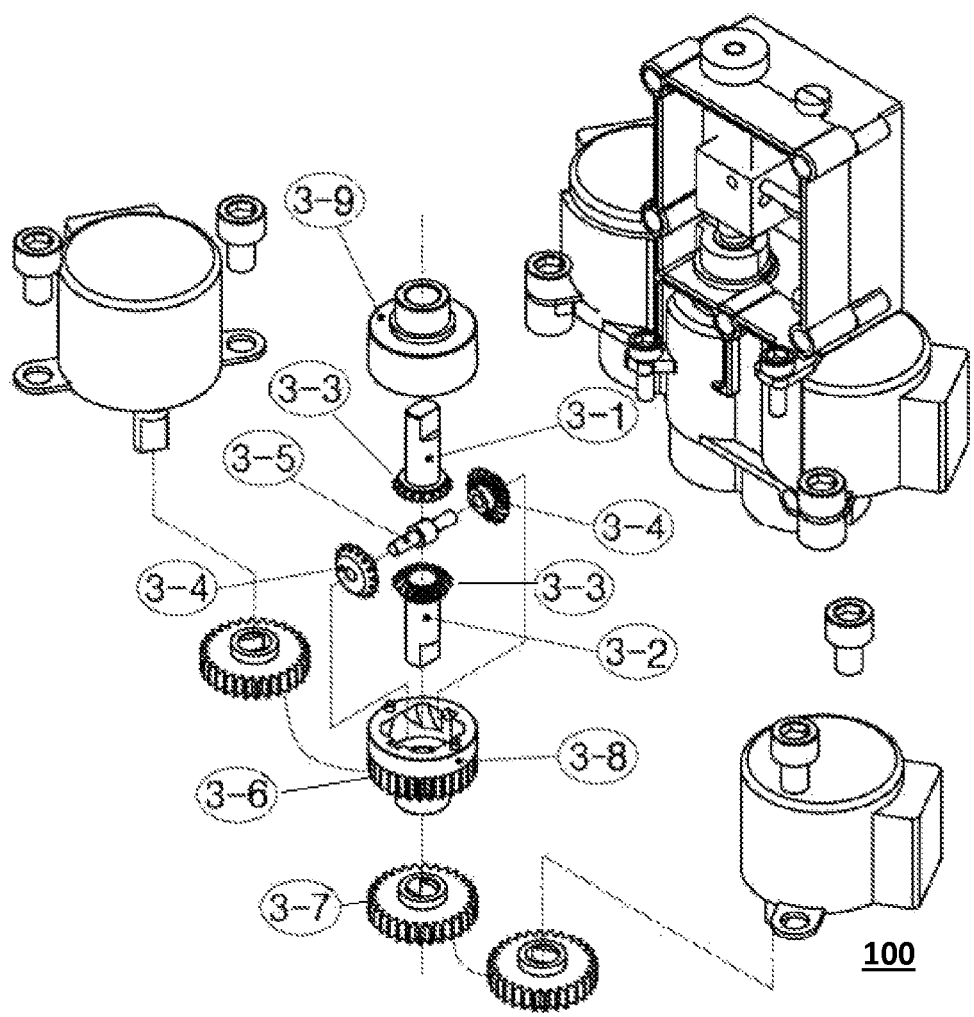
FIG. 2 is an exploded view of a differential of the adjusting mechanism according to an embodiment of the invention.
Figure 3:
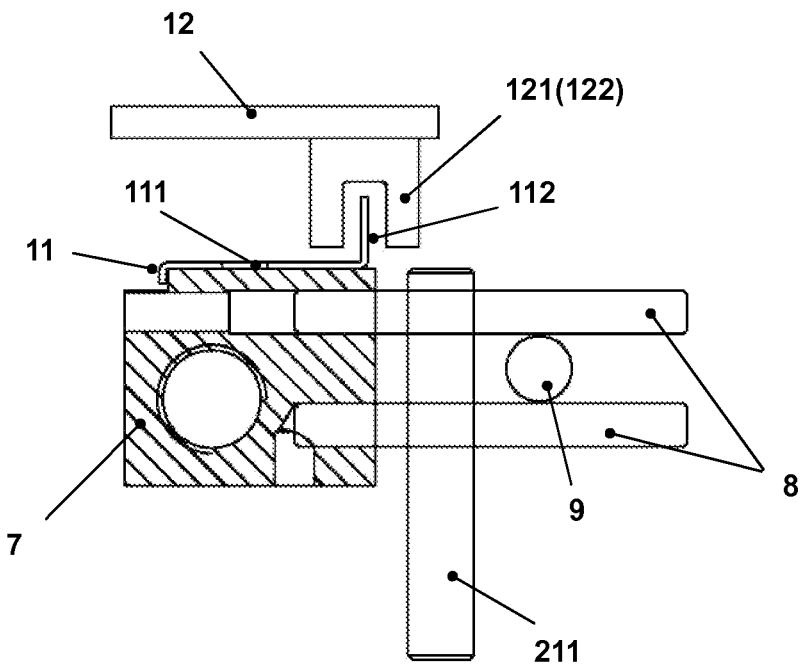
FIG. 3 is a plan view of a limit piece of the adjusting mechanism according to an embodiment of the invention.

The differential 3, as described in detail with reference to FIG. 2, comprises a first output shaft 3-1 with a differential gear 3-3 at one end, a second output shaft 3-2 with a differential gear 3-3 at one end, and a pair of differential planetary gears 3-4 connected by a differential planetary gear shaft 3-5, wherein the planetary gears 3-4 engage with the differential gears 3-3. The differential 3 is further provided with an upper housing 3-9 and lower housing 3-8. The upper housing and lower housing connect to form a receiving space, which receives the components 3-1 to 3-5. The output ends of the first output shaft 3-1 and the second output shaft 3-2 extend out of the upper housing 3-9 and the lower housing 3-8, respectively. The periphery of the lower housing 3-8 is provided with a first driven gear 3-6 and the output end of the second output shaft 3-2 is attached to a second driven gear 3-7. The first driven gear 3-6 engages with the first active gear 4-2 shown in FIG. 1, while the second driven gear 3-7 engages with the second active gear 5-2.

The screw rod 6 rotates with the rotation of the first output shaft 3-1. The position of the screw rod 6 relative to the housing remains fixed when the screw rod 6 rotates. The rotation of the first output shaft 3-1 is driven by the rotation of the first stepping motor 4-1, the rotation of the second stepping motor 5-1, or the in-phase/reverse rotation of the two stepping motors together to drive the rotation of the screw rod 6, which further drives the moving block 7 to reciprocate along the axial direction of the screw rod 6.

It is known that a differential is able to drive rotation motion from a single shaft to two shafts, and drive the two shafts to rotate at different rotation speeds. The differential is normally provided with an input shaft and two output shafts. The present invention uses one of the two output shafts as the second input shaft based on the operation principle of the differential so that the remaining output shaft can create different rotation speed and rotation direction based on the different input transmission of the two output shafts. For example, it is assumed that the drive ratio provided by the first stepping motor is 0.75 in the invention and the drive ratio provided by the second stepping motor is 0.5. When these two motors rotate in-phase, the output drive ratio of the first output shaft is 0.25. When these two motors rotate reversely, the output drive ratio of the first output shaft is 1.25. When these two motors rotate separately, the output drive ratio can be 0.75 or 0.5. The rotation status of two motors can be different so that four kinds of rotation speeds of the screw rod 6 can be created.

The limit piece 11 and limit PCB 12 are provided in order to avoid damage caused by the excessive movement of the moving block 7. According to FIGS. 1, 3 and 4A-4C, the limit piece 11 is a rectangular bent piece. The main body 111 of the limit piece is fixed with one side of the moving block 7, opposite the PCB 12, and the bent body 112 faces towards the limit PCB 12. The limit PCB 12 includes two aligned U-shaped elements 121, 122, creating one U-shaped groove extending toward the limit piece 11 and restricting the movement of the limit piece 11. The bent body 112 of the limit piece moves within the U-shaped groove with the movement of the moving block 7.

Figure 4A:
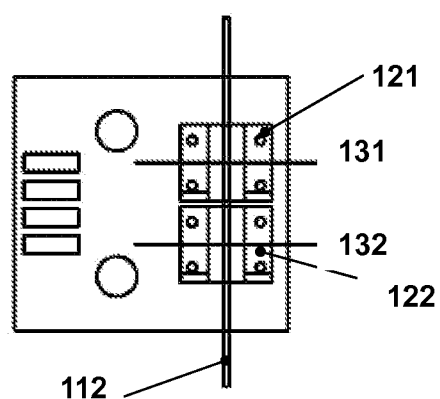
FIGS. 4A-4C are schematic diagrams of multiple positions of the limit piece according to an embodiment of the invention.
Figure 4B:
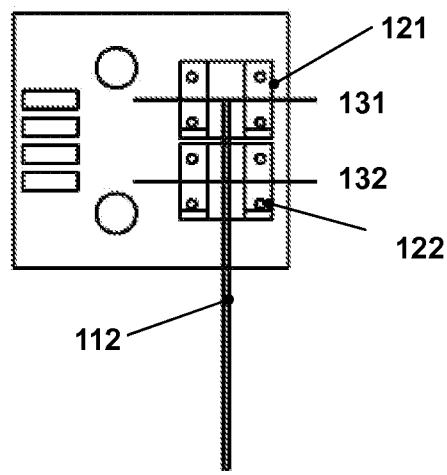
Figure 4C:
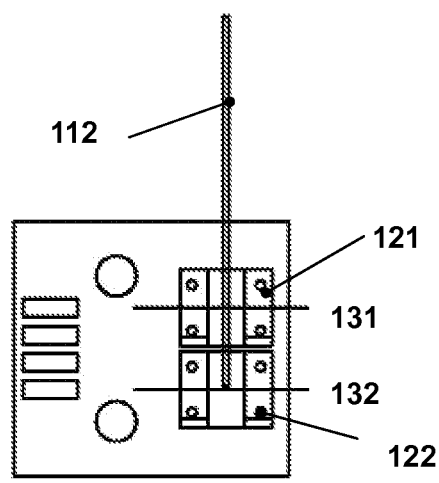

Users can determine whether the moving block is in the extreme position according to the position of the limit piece 11 in the U-shaped groove. As shown in FIG. 4A, the bent body 112 of the limit piece 11 overlaps position sensing elements 131, 132 in the U-shaped grooves simultaneously when the moving block is in a normal position. FIG. 4B and 4C show two extreme positions. As shown in FIG. 4B, the position sensing element 131 in the upper U-shaped groove 121 is not overlapped and the moving block 7 is at the bottom position. As shown in FIG. 4C, the position sensing element 132 in the lower U-shaped groove 122 is not overlapped and the moving block 7 is at the top position.

The adjusting mechanism 100 described above is positioned in a laser collimator so that the moving block 7 is attached to the component that controls the horizontal position of the laser collimator. The horizontal sensor in the laser collimator is attached to the motors so that the rotation status of the motors controlled by the horizontal sensor drive the movement of the moving block to implement the leveling of the laser components in the laser collimator.

Figure 5:
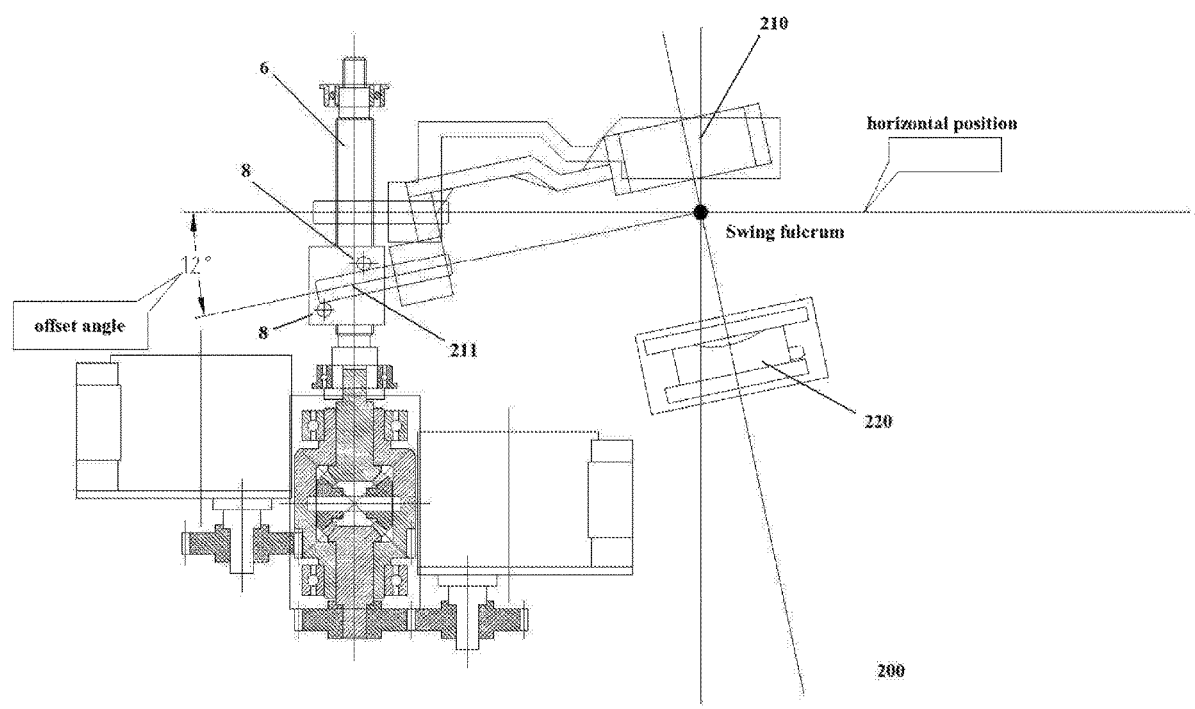
FIG. 5 is a schematic diagram of a laser collimator according to an embodiment of the invention.
Figure 6:
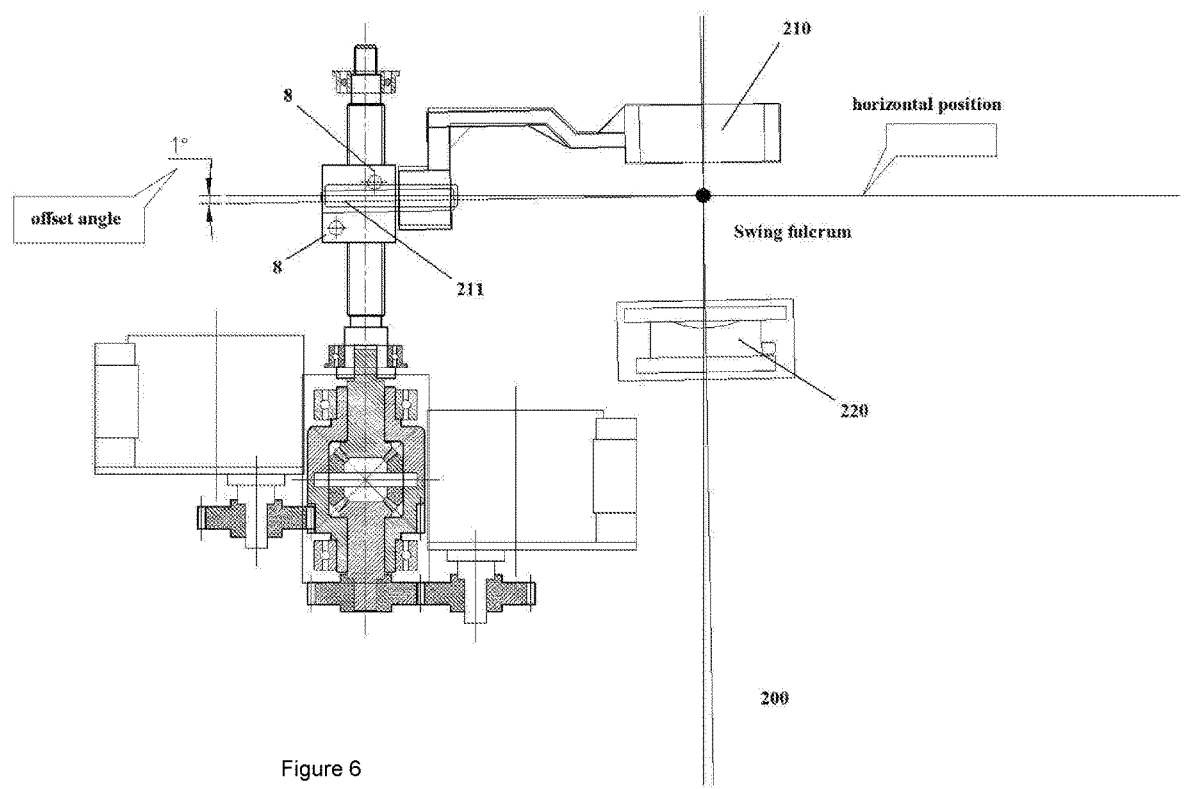
FIG. 6 is a schematic diagram of the laser collimator according to an embodiment of the invention.

FIG. 5 and FIG. 6 show a laser collimator with the adjusting mechanism 100. The laser collimator can be a laser leveling instrument or laser projector. The laser collimator comprises a housing (not shown) which is received in the swinging bracket 210, lasers (not shown) and horizontal sensor 220. Normally, these three components are in a fixed position, i.e, the horizontal position of these three remains identical. A connecting rod 211 is provided on the swinging bracket 210. The connecting rod 211 can be attached to the moving block 7 directly or pivotally.

In an embodiment, the invention provides another connection method of the connecting rod and moving block. As shown in FIG. 1, the moving block 7, the pair of parallel rods 8, and limit rod 9 form an open connecting area. The connecting rod 211 of the swinging bracket 210 extends into the open connecting area to connect the connecting rod 211 and moving block 7. In another embodiment, the connecting rod 211 extends into the gap between the parallel rods 8 to connect the connecting rod 211 and moving block 7. The arrangement of the parallel rods 8 and limit rod 9 is to avoid the co-rotation of the moving block 7 and screw rod 6. Other methods such as connecting the connecting rod 211 and moving block 7 directly or pivotally can also achieve the effect.

In order to relate the information of the horizontal position of the swinging bracket to the working status of the motors, the horizontal sensor 220 is electrically connected with the two stepping motors. When the information of the horizontal position detected by the horizontal sensor is offset from the horizontal position, for example, the offset angle is 12° as shown in FIG. 5, the horizontal sensor makes the two motors rotate reverse simultaneously so that the rotation speed of the screw rod is increased. When the rotation speed is increased, the swinging bracket can approach the horizontal position quickly. When the actual position of the swinging bracket is about to reach the horizontal position, for example, the offset angle is 1° as shown in FIG. 6, the horizontal sensor can make only one motor rotate or two motors rotate in the same direction simultaneously to reduce the rotation speed of the screw rod and increase the accuracy of adjustment.

In other embodiments, some control devices can be further provided (not shown). The control devices can control the rotation mode of the two stepping motors according to the position information feedback from the horizontal sensors.

What is claimed is:

1. An adjusting mechanism, comprising:
   a differential including a first output shaft, a second output shaft, a first driven gear, and a second driven gear, the second output shaft connected to the first driven gear and the second driven gear;
   a first stepping motor with a first drive gear disposed on a rotary shaft thereof, the first drive gear engaging with the first driven gear;
   a second stepping motor with a second drive gear disposed on a rotary shaft thereof, the second drive gear engaging with the second driven gear;
   a screw rod connected to the first output shaft at a first end of the screw rod such that the screw rod rotates along with a rotation of the first output shaft; and
   a moving block threadably connected to the screw rod to permit motion of the moving block along a longitudinal axis of the screw rod; wherein
   the first output shaft rotates according to a rotation of the first and second stepping motors so as to drive a movement of the moving block along the screw rod.

2. The adjusting mechanism of claim 1, wherein the rotation of the first and second stepping motors is in-phase rotation, reverse rotation or separate rotation.

3. The adjusting mechanism of claim 2, wherein the moving block moves at a first speed along the screw rod when the rotation of the first and second stepping motors is a reverse rotation.

4. The adjusting mechanism of claim 3, wherein the moving block moves at a second speed lower than the first speed when the rotation of the first and second stepping motors is in-phase rotation or separate rotation.

5. The adjusting mechanism of claim 1, wherein the second driven gear is disposed at an end of the second output shaft that extends out of the differential.

6. The adjusting mechanism of claim 2, further comprising a housing containing the differential, first and second stepping motors, screw rod, and moving block.

7. The adjusting mechanism of claim 6, wherein a second end of the screw rod extends through a screw rod stationary hole in the housing, and a screw rod stationary ring attaches a second end of the screw rod to the housing.

8. The adjusting mechanism of claim 6, further comprising
a limit rod disposed in the housing and positioned parallel to the screw rod, and
a pair of parallel rods extending from the moving block, wherein
the limit rod is positioned between the pair of parallel rods.

9. The adjusting mechanism of claim 8, wherein the moving block, pair of parallel rods, and limit rod define an area adjacent to the moving block that is open between the pair of parallel rods.

10. The adjusting mechanism of claim 6, further comprising a limit piece disposed on the moving block and positioned opposite a limit PCB disposed on the housing, wherein the limit piece fits within the limit PCB, and the limit PCB limits the motion of the limit piece and moving block.

11. A laser collimator, comprising:
a swinging bracket;
a laser connected to the swinging bracket;
a level sensor connected to the laser; and
an adjusting mechanism including
a differential including a first output shaft, a second output shaft, a first driven gear, and a second driven gear, the second output shaft connected to the first driven gear and the second driven gear, a first stepping motor with a first drive gear disposed on a rotary shaft thereof, the first drive gear engaging with the first driven gear,
a second stepping motor with a second drive gear disposed on a rotary shaft thereof, the second drive gear engaging with the second driven gear,
a screw rod connected to the first output shaft at a first end of the screw rod such that the screw rod rotates along with the rotation of the first output shaft, and
a moving block threadably connected to the screw rod to permit motion of the moving block along the longitudinal axis of the screw rod, wherein the first output shaft rotates with the rotation of the first and second stepping motors so as to drive the movement of the moving block along the screw rod; wherein
the swinging bracket is connected with the moving block.

12. The laser collimator of claim 11, wherein the rotation of the first and second stepping motors is in-phase rotation, reverse rotation or separate rotation.

13. The laser collimator of claim 12, wherein the moving block moves at a first speed along the screw rod when the rotation of the first and second stepping motors is a reverse rotation, and the moving block moves at a second speed lower than the first speed when the rotation of the first and second stepping motors is in-phase rotation or separate rotation.

14. The laser collimator of claim 11, further comprising a housing containing the differential, first and second stepping motors, screw rod, and moving block.

15. The laser collimator of claim 14, further comprising
a limit rod disposed in the housing and positioned parallel to the screw rod, and
a pair of parallel rods extending from the moving block, wherein
the limit rod is positioned between the pair of parallel rods.

16. The laser collimator of claim 15, wherein the moving block, pair of parallel rods, and limit rod define an area adjacent to the moving block that is open between the pair of parallel rods.

17. The laser collimator of claim 16, wherein the swinging bracket further includes a connecting rod that extends into the open area between the pair of parallel rods.

18. The laser collimator of claim 17, further comprising a limit piece disposed on the moving block and positioned opposite a limit PCB disposed on the housing, wherein the limit piece fits within the limit PCB, and the limit PCB limits the motion of the limit piece and moving block.

19. The laser collimator of claim 11, wherein the level sensor is electrically connected with the first and second stepping motors.

20. The laser collimator of claim 19, further comprising a control device electrically connected to the level sensor and the first and second stepping motors, wherein the control device controls the operation of the first and second stepping motors based on position information from the level sensor.

* * * * *

UNITED STATES PATENT AND TRADEMARK OFFICE
CERTIFICATE OF CORRECTION

PATENT NO. : 9,952,402 B2
APPLICATION NO. : 14/885570
DATED : April 24, 2018
INVENTOR(S) : Ou Zhang and Dongdong Peng It is certified that error appears in the above-identified patent and that said Letters Patent is hereby corrected as shown below:

On the Title Page

Under item (71), Applicant, the name is shown incorrectly as Changzhou Huada Kejie Opto-Electroc Instrument Co., Ltd. Please change the Applicant's name to read --Changzhou Huada Kejie Opto-Electro Instrument Co., Ltd.--

Signed and Sealed this
Seventh Day of August, 2018

Andrei Iancu
*Director of the United States Patent and Trademark Office*